Oct. 16, 1923.
J. L. CHESNUTT
1,471,307
SWIVEL CASTER
Filed June 9, 1922
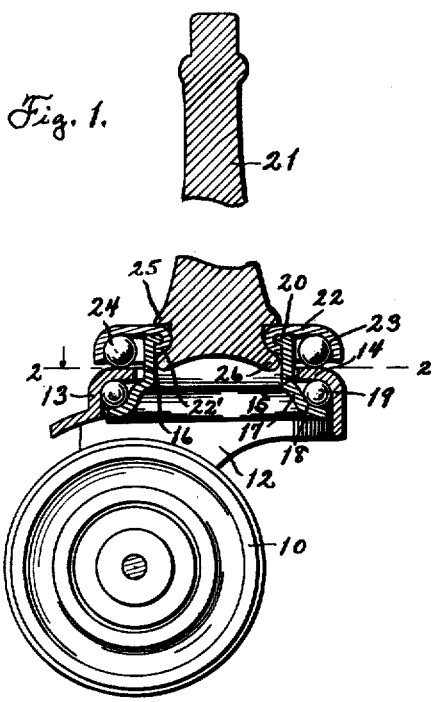
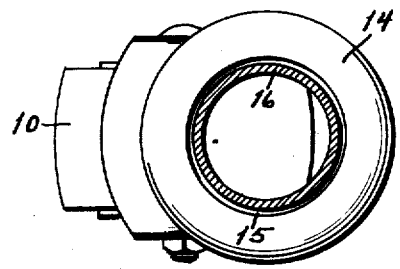
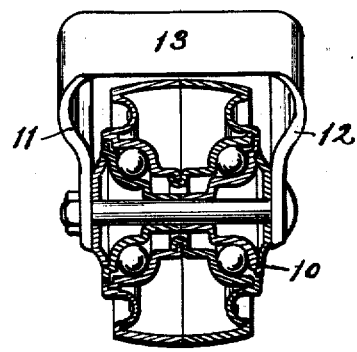
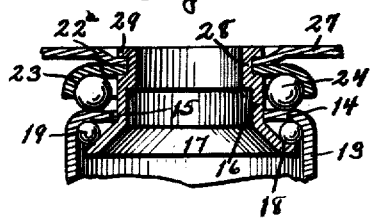
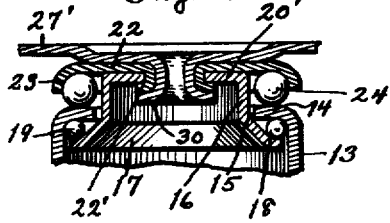
INVENTOR:
J. L. CHESNUTT
By Earl M. Sinclair
Atty.

Patented Oct. 16, 1923.

1,471,307

UNITED STATES PATENT OFFICE.

JOHN L. CHESNUTT, OF LONG BEACH, CALIFORNIA.

SWIVEL CASTER.

Application filed June 9, 1922. Serial No. 567,086.

*To all whom it may concern:*

Be it known that I, JOHN LOUCIEN CHESNUTT, a citizen of the United States of America, and resident of Long Beach, Los Angeles County, California, have invented a new and useful Swivel Caster, of which the following is a specification.

The object of this invention is to provide an improved construction for a swivel caster especially adapted for use on household and office furniture.

A further object of this invention is to provide an improved swivel caster having anti-friction elements between the stationary and swiveling parts possessing the highest swiveling efficiency, thereby securing ease in operation, longer life of parts, less strain on the load object and less wear on the floors traversed.

A further object of this invention is to produce a swivel caster of exceedingly simple construction, which is economical to manufacture and not apt to get out of order.

A further object of this invention is to provide an improved swivel caster so arranged as to provide a large diameter for the race of balls taking lateral strain and to afford an anti-friction retaining means resulting in decreased leverage, less strain and friction and consequent wear and breakage, as well as increasing the swiveling efficiency.

A further object of this invention is to provide improved means for securing the caster to a load object.

A further object of this invention is to provide improved means for connecting parts of the load bearing member.

My invention consists in the construction, arrangement and combination of elements hereinafter set forth, pointed out in my claims and illustrated by the accompanying drawing, in which—

Figure 1 is a vertical section illustrating the swiveling features of my improved caster. Figure 2 is a transverse section on the line 2—2 of Figure 1. Figure 3 is a front view of the lower portion of the caster, the wheel being shown in section. Figure 4 is a vertical section of the swiveling parts, showing a modified construction. Figure 5 is a similar view showing a further modified construction.

This invention relates to and is an improvement on the devices illustrated, described and claimed in Letters Patent Number 1,392,914 granted to me October 11, 1921, to which reference is made.

In the construction of the device as shown the numeral 10 designates a wheel of any suitable construction, journaled for rotation in a wheel yoke formed with spaced parallel wings 11, 12 formed on and extending downwardly from a cylindrical body portion 13. The wings 11, 12 preferably taper toward their lower ends and project rearwardly of the vertical axis of the body 13, and the axis of rotation of the wheel is set to the rear of such vertical axis. The wheel 10 preferably is of suitable anti-friction construction, one form of which is shown in Figure 3. The cylindrical body 13 of the yoke is formed at its top with an annular cover member 14 having a relatively large opening 15 of circular form concentric with the vertical axis of the device. A load-bearing device is provided and extends within the body portion of the wheel yoke, on which load-bearing device said wheel yoke is adapted to swivel or rotate. This load device comprises primarily a cylindrical shell 16 extending through the central aperture 15 of the top of wheel yoke and formed at its lower end with an outwardly and downwardly extending peripheral flange 17 projecting beneath the top of the wheel yoke and spaced from the top and body thereof. The peripheral flange 17 is formed on its upper face and near its periphery with a concaved or grooved surface forming a ball race 18 within which is mounted an annular row 19 of bearing balls, which also contact the body and top of the wheel yoke. It is the function of the balls 19 to receive lateral pressure and strain only, which strain is exerted on them on oblique or diagonal lines of approximately forty-five degrees to the perpendicular. The cylindrical shell 16 extends a short distance above the top 14 of the wheel yoke and is formed with an inwardly projecting flange or shoulder 20 of annular form. As shown in Figure 1 the load-bearing device is provided with a stem 21, which may be of any suitable form and extend a considerable distance above the shoulder or flange 20. The stem 21 is adapted to be received within a socket or bore of an object to be supported, such as a leg or other portion of an article of furniture, and to be secured and centered therein by any desired means; or other suitable means may be employed to secure the caster relative to a load object, as hereinafter indicated.

A cupped washer 22 is mounted over the stem 21 and fits snugly the lower end thereof, resting rigidly on the flange or shoulder 20. The washer 22 is cupped, pressed or curved downwardly at its outer periphery to form a raceway 23 and retaining means for an annular row 24 of bearing balls resting on the annular plate or top 14 of the wheel yoke. The inner peripheral portion of the cupped washer 22 is pressed and bent to form a recurved flange 22' which embraces and is riveted to the flange 20 at the top of shell 16. The base of the stem 21 fits within the cupped washer 22 and may be upset or riveted on opposite sides thereof, at the points 25, 26, to hold it securely in place. The load object to be supported is adapted to rest on the washer 22, which would extend circumferentially of the hole or socket in said object when the connection above referred to is employed. The washer 22 in turn rests on the balls 24, which are designed to receive vertical pressure, or pressure of the load only, and no lateral strains, as there is a clearance between said balls and the adjacent sides of the shell 16, or in other words said balls have some lateral play or freedom of movement.

It will be noted that the manner of connecting the swiveling member to the stationary member, and of forming the ball races, provides raceways of relatively large diameter for both rows of bearing balls, which affords large anti-friction surfaces resulting in decreased leverage on the device under strain, lessens strain, friction, wear, and breakage and gives increased swiveling efficiency.

Also that the provision that each row of bearing balls receives pressure in one direction only, either lateral or vertical, adds largely to the efficiency and life of the device by decreasing wear on the balls and races, as the balls have no tendency to rotate on more than one axis simultaneously.

Figure 4 illustrates another form similar to that shown in my patent above referred to, in which the stem 21 is omitted and is substituted by a horizontal plate 27, of any desired form and shape, a portion only being shown. The plate 27 is formed with a central hole fitting the upper end of a neck 28 formed on the load bearing member or shell, above the flange or shoulder 20, said plate resting on the cupped washer, designated by the numeral 22ª and being held in place by an outturned flange 29 on the upper end of said neck. In this instance the inner peripheral flange such as 22' of the cupped washer is omitted, and the washer and plate 27 are riveted between and held by the flange or shoulder 20 and the flange 29. The plate 27 is adapted to be attached to the flat lower surface of a load object in any suitable manner.

In Figure 5 a still further modified form is shown, in which the flange is exaggerated or enlarged and is designated by the numeral 20', a cupped washer 22 like that of Figure 1 being employed. A horizontal plate 27' is used which has a smaller central opening than that shown in Figure 4, and is drawn down through the central openings of the cupped washer and the flange 20' in the form of a tubular rivet 30, which is upset or riveted against the lower sides of said members and holds the plate 27' securely in place.

In each construction, the shoulder, flange or offset 20 or 20' spaces the disk or washer 22 or 22ª correctly relative to the top of the wheel yoke, allowing space for proper swiveling and for both rows of balls.

The anti-friction connecting means between the stationary and swiveling parts provides a raceway in which the balls extend outside of the vertical plane of the axle of the wheel 10, thus decreasing leverage, strain, wear and breakage of the parts.

I claim as my invention—

1. In a swivel caster, a wheel yoke and wheel pivoted therein, said yoke being formed with a flat annular top member, a load-bearing member extending within said yoke and formed with an external shoulder, a separately formed, downwardly cupped disk mounted on said shoulder, and bearing balls within said cupped disk resting on said annular top member of the yoke, said load bearing member being formed with a central aperture, said cupped disk being of annular form and having its inner peripheral portion extending within the central aperture of said load bearing member and riveted thereto.

2. In a swivel caster, a wheel yoke and wheel pivoted therein, said yoke being formed with a flat annular top member, a load-bearing member extending within said yoke and formed with an external shoulder, a cupped disk of annular form mounted on said shoulder, bearing balls within said cupped disk resting on said annular top member of the yoke, said load bearing member being formed with a central aperture, said cupped disk having its inner peripheral portion extending within said central aperture and riveted thereto, and an attaching member adapted to be secured to a load object, said attaching member extending within the central aperture of the cupped disk and load bearing member and riveted thereto.

Signed at Long Beach, in the county of Los Angeles and State of California, this 11th day of May, 1922.

JOHN L. CHESNUTT.